(12) United States Patent
Chang et al.

(10) Patent No.: US 9,709,753 B1
(45) Date of Patent: Jul. 18, 2017

(54) POLARITY CHANGEABLE LC DUPLEX ADAPTER

(71) Applicant: Senko Advanced Components, Inc., Marlborough, MA (US)

(72) Inventors: Jimmy Jun-Fu Chang, Worchester, MA (US); Kazuyoshi Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/996,455

(22) Filed: Jan. 15, 2016

(51) Int. Cl.
*G02B 6/38* (2006.01)

(52) U.S. Cl.
CPC ........... *G02B 6/3831* (2013.01); *G02B 6/387* (2013.01); *G02B 6/3825* (2013.01); *G02B 6/3879* (2013.01)

(58) Field of Classification Search
CPC .. G02B 6/3831; G02B 6/3825; G02B 6/3879; G02B 6/387
See application file for complete search history.

(56) References Cited

U.S. PATENT DOCUMENTS

2013/0259429 A1\* 10/2013 Czosnowski ........ G02B 6/3885
385/78

\* cited by examiner

*Primary Examiner* — Ryan Lepisto
(74) *Attorney, Agent, or Firm* — Pepper Hamilton LLP

(57) ABSTRACT

A multi-polarity fiber optic adapter is configured to provide a plurality of connector polarity options. The adapter includes a housing and a plurality of ports, each port configured to receive and establish an optical connection with a ferrule of a fiber optic connector. The adapter further includes a plurality of first-polarity connector clip assemblies positioned within the housing such that, when the fiber optic connector is inserted into the adapter in a first position, the fiber optic connector is engaged with the first-polarity connector clip assemblies, thereby establishing a first-polarity connection. The adapter also includes a plurality of second-polarity connector clip assemblies positioned within the housing such that, when the fiber optic connector is inserted into the adapter in a second position, the fiber optic connector is engaged with the plurality of second-polarity connector clip assemblies, thereby establishing a second-polarity connection.

10 Claims, 3 Drawing Sheets

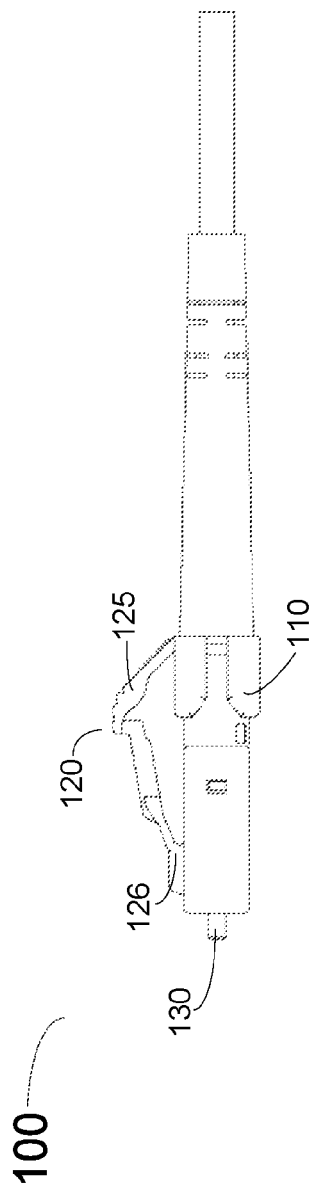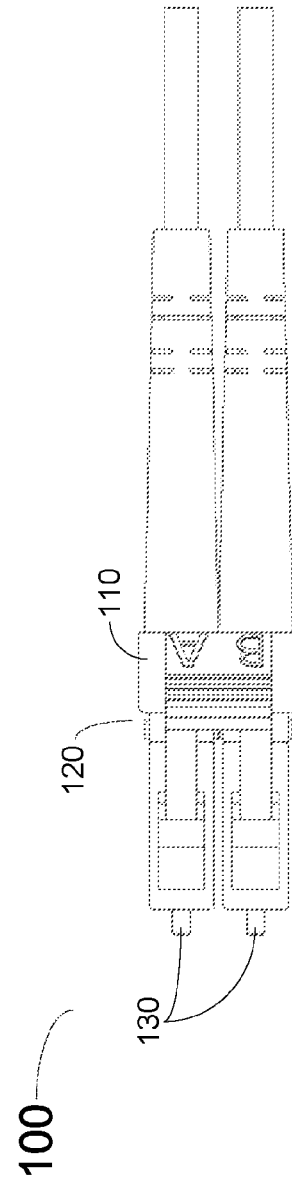
FIG. 1A
*Prior Art*
FIG. 1B
*Prior Art*

POLARITY CHANGEABLE LC DUPLEX ADAPTER

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using LC type connectors may contain and connect two fibers.

Typically, LC type connectors are joined together to connect the optical transmission path of one fiber optic cable to another fiber optic cable or device, and the connection may be made by inserting the LC type connectors in an LC adapter. An adapter generally includes a housing, or portion of a housing, having at least one port which is configured to receive and hold a connector to facilitate the optical connection of a connector ferrule with a ferrule of another connector or other device, thereby establishing an optical connection. Adapters may be used to facilitate connections contained within a chassis. The term "chassis" as used herein broadly refers to a containment structure for housing electrical components or switching components.

The polarity of a connector may is almost always predisposed during manufacturing of the connector and associated cable, For installations where the polarity may need to be changed for one reason or another, such as a renovation or installation of a new optical component, the polarity of typical connectors is not changeable or only changeable after disassembly and reassembly in the opposite designation. For example, some LC type connectors include a modular housing configured such that the position of the fibers terminated within the connector can be reversed, thus changing the polarity of the connector. However, this can be a time-sensitive procedure and, based upon the abilities of the person changing the connector, may be prone to error.

Therefore, there remains a need for multi-fiber, fiber optic adapters that have the flexibility of easily changing the polarity of a fiber connection quickly and efficiently on site.

SUMMARY

In an embodiment, a multi-polarity fiber optic adapter configured to provide a plurality of connector polarity options is described. The adapter may include a housing, a plurality of ports positioned within the housing, each port configured to receive a ferrule of a fiber optic connector and establish an optical connection with the ferrule, a plurality of first-polarity connector clip assemblies positioned within the housing such that, when the fiber optic connector is inserted into the adapter in a first position, a spring-latch assembly on the fiber optic connector is engaged with the plurality of first-polarity connector clip assemblies, thereby establishing a first-polarity connection between the fiber optic connector and the adapter, and a plurality of second-polarity connector clip assemblies positioned within the housing such that, when the fiber optic connector is inserted into the adapter in a second position, the spring-latch assembly on the fiber optic connector is engaged with the plurality of second-polarity connector clip assemblies, thereby establishing a second-polarity connection between the fiber optic connector and the adapter.

In another embodiment, a system for providing multiple polarity connections between a fiber optic connector and adapter is described. The system may include a fiber optic connector and a multi-polarity fiber optic adapter configured to a receive the fiber optic connector. The fiber optic connector may include a first ferrule, a second ferrule, and a spring-latch assembly. The multi-polarity fiber optic adapter may include a housing, a plurality of ports positioned within the housing, each port configured to receive a ferrule of the fiber optic connector and establish an optical connection with the received ferrule, a plurality of first-polarity connector clip assemblies positioned within the housing such that, when the fiber optic connector is inserted into the adapter in a first position, the spring-latch assembly is engaged with the plurality of first-polarity connector clip assemblies, thereby establishing a first-polarity connection between the fiber optic connector and the adapter, and a plurality of second-polarity connector clip assemblies positioned within the housing such that, when the fiber optic connector is inserted into the adapter in a second position, the spring-latch assembly is engaged with the plurality of second-polarity connector clip assemblies, thereby establishing a second-polarity connection between the fiber optic connector and the adapter.

In another embodiment, a method of changing the polarity of an optical connection is described. The method may include providing a fiber optic connector, the connector including a first ferrule, a second ferrule, and a spring-latch assembly. The method may further include providing a multi-polarity fiber optic adapter configured to a receive the fiber optic connector, the adapter including a housing, a plurality of ports positioned within the housing, each port configured to receive a ferrule of the fiber optic connector and establish an optical connection with the received ferrule, a plurality of first-polarity connector clip assemblies positioned within the housing such that, when the fiber optic connector is inserted into the adapter in a first position, the spring-latch assembly is engaged with the plurality of first-polarity connector clip assemblies, thereby establishing a first-polarity connection between the fiber optic connector and the adapter, and a plurality of second-polarity connector clip assemblies positioned within the housing such that, when the fiber optic connector is inserted into the adapter in a second position, the spring-latch assembly is engaged with the plurality of second-polarity connector clip assemblies, thereby establishing a second-polarity connection between the fiber optic connector and the adapter. The method may also include inserting the fiber optic connector into the adapter in the first position, thereby establishing the first-polarity connection between the fiber optic connector and the adapter, removing the fiber optic connector from the multi-polarity fiber optic adapter, rotating the fiber optic connector 180 degrees, and inserting the connector into the adapter in the second position, thereby establishing the second-polarity connection between the fiber optic connector and the adapter.

BRIEF DESCRIPTION OF THE FIGURES

FIGS. 1A and 1B depict a duplex connector and fiber optic cables.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

Figure 3:
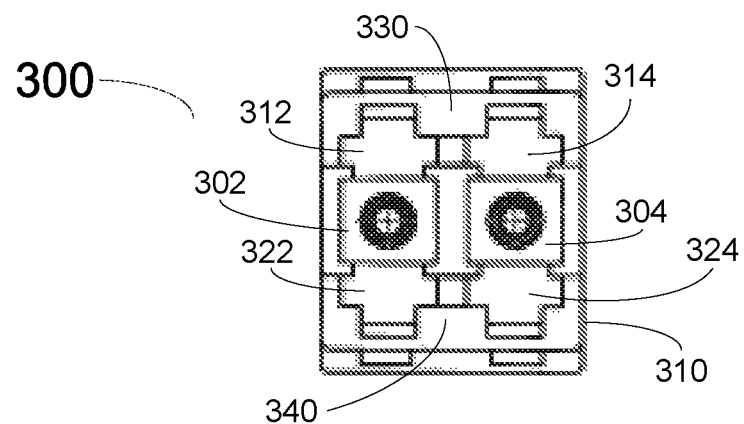
FIG. 3 depicts a multi-polarity duplex adapter according to an embodiment.

For connection of optical fibers or cables together or with other fiber optic devices, the terminal ends of a cable may include a duplex connector 100 as is represented in FIGS. 1A and 1B, respectively, for providing a connection means for two optical fibers. The connector 100 may include a connector clip 110 configured to clip multiple single fiber connectors together. For example, in the duplex connector 100 as shown in FIGS. 1A and 1B, the connector clip 110 is designed and configured to clip two single-fiber connectors. The connector 100 may further include a spring-latch assembly 120 as shown in FIGS. 1A and 1B configured to interact with and connect with an adapter, for example, adapter 300 as shown in FIG. 3 and described below in additional detail.

As shown in FIG. 1B, the spring-latch assembly 120 includes a single release tab 125 and hinge 126 that act in concert upon a force being applied to the tab 125, thereby resulting in the spring-latch assembly being depressed, allowing the connector 100 to be disengaged and removed from an adapter. Conversely, when the connector 100 is inserted into an adapter, the hinge 126 may depress upon insertion and spring back into place, thereby locking the connector 100 into the adapter.

As is further shown in FIGS. 1A and 1B, each optical fiber may be terminated in a ferrule 130, positioned such that an optical connection is established between an associated optical fiber and a device or other optical fiber connected to the adapter.

Figure 2:
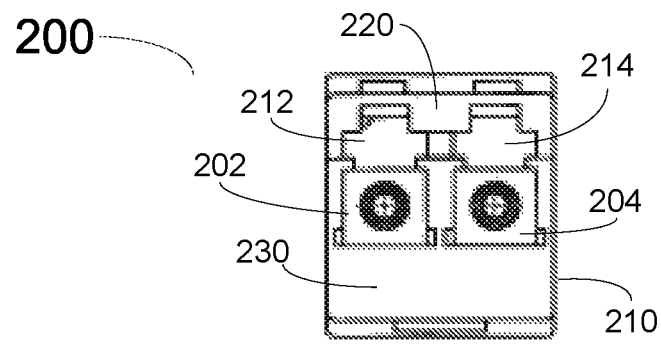
FIG. 2 depicts a single-polarity duplex adapter.

FIG. 2 illustrates a duplex adapter 200 for receiving a duplex fiber optic connector according to existing technology. FIG. 2 illustrates a sample front view of adapter 200. The adapter 200 may include a housing 210 configured to house two aligned ports 202, 204 for aligning with and receiving a duplex fiber optic connector therein to align and connect optical fibers end-to-end, or to connect the duplex fiber optic connector to an optical device.

For retention of a duplex connector within each of the ports 202, 204, the ports may be provided internally with a connector clip assembly 212, 214 that may be formed and configured to receive the spring-latch assembly of the connector (e.g., spring-latch connector assembly 120 as shown in FIGS. 1A and 1B). The combination of the arrangement of ports 202, 204 and the connector clip assemblies 212, 214 may act to both prevent a duplex connector from being improperly inserted into the adapter 200 while also providing a latching feature that prevents the connector from inadvertently falling out of other otherwise becoming disengaged with the adapter.

Additionally, a top surface 220 of the housing 210 may include multiple receiving features positioned at or about the connector clip assemblies such that the spring-latch assemblies of the optical connector have adequate space to depress and expand within the adapter 200 upon insertion of the connector. Thus, the receiving features may be sized according to the anticipated or allowed movement of the spring-latch assemblies of the optical connectors intended for use with the adapter 200. In contrast to the top surface 220 of the housing 210, a bottom surface 230 of the housing may be smooth or otherwise essentially featureless as it regards insertion and removal of a connector from the adapter 200. As shown in FIGS. 1A and 1B, a duplex optical cable and connector have a spring-latch assembly on one side and, as such, existing adapters like adapter 200 only have receiving means on a single surface, e.g., the top surface 220 as shown in FIG. 2. Thus, adapter 200 is limited to receiving the connector in a single orientation, thus resulting in the same polarity connection each time a connector is plugged into the adapter unless the connector itself is replaced or otherwise modified which, as noted above, is a time consuming and potentially error-prone task.

FIG. 3 illustrates a duplex adapter 300 for receiving a duplex connector, the adapter configured to provide for quick and efficient change of polarity of the connector. FIG. 3 shows a front view of adapter 300, similar in orientation and positioning as adapter 200 as shown in FIG. 2. The adapter 300 may include a housing 310 configured to house two aligned ports 302, 304 for aligning with and receiving a duplex fiber optic connector therein to align and connect optical fibers end-to-end, or to connect the duplex fiber optic connector to an optical device.

For retention of a duplex connector within each of the ports 302, 304, the ports may be provided internally with a first-polarity connector clip assembly 312, 314 that may be formed and configured to receive the spring-latch assembly of the connector (e.g., spring-latch connector assembly 120 as shown in FIGS. 1A and 1B). The combination of the arrangement of ports 302, 304 and the first-polarity connector clip assemblies 312, 314 may act to both prevent a duplex connector from being improperly inserted into the adapter 300 while also providing a latching feature that prevents the connector from inadvertently falling out of other otherwise becoming disengaged with the adapter. Thus, when inserted such that the spring-latch connector assembly of the connecter is engaged with the first-polarity connector clip assemblies 312, 314 the connector is engaged with the adapter 300 to establish a first-polarity connection.

As also shown in FIG. 3, the adapter 300 may further include second-polarity connector clip assemblies 322, 324. The second-polarity connector clip assemblies 322, 324 may be positioned such that, when the spring-latch connector assembly of the duplex connecter is engaged with the second-polarity connector clip assemblies 322, 324, the connector is engaged with the adapter 300 to establish a second-polarity connection.

Accordingly, adapter 300 provides for a quick and efficient way of changing the polarity of a duplex fiber optic connector without disassembly of any of the used components. Rather, in order to reverse or otherwise change to polarity, a technician or other user merely needs to remove the connector from the adapter 300, flip the connector 180 degrees, and reinsert the connector into the adapter until the spring-latch assembly fully engages the second-polarity connector clip assemblies 322, 324.

Additionally, a top surface 330 of the housing 310 may include multiple receiving features positioned such that the spring-latch assemblies of the optical connector have adequate space to depress and expand within the adapter 300 upon insertion of the connector. Thus, the receiving features of the top surface 330 may be sized according to the anticipated or allowed movement of the spring-latch assemblies of the optical connectors intended for use with the adapter 300. Similar to the top surface 330 of the housing 310, a bottom surface 340 of the housing 310 may also include multiple receiving features positioned such that the spring-latch assemblies of the optical connector have adequate space to depress and expand within the adapter 300 upon insertion of the connector. Thus, the receiving features of the bottom surface 340 may be sized according to the anticipated or allowed movement of the spring-latch assemblies of the optical connectors intended for use with the adapter 300.

It should be noted that, based upon the design of the adapter 300 as described above, the adapter may be manufactured such that it is the same, or approximately the same, size as a traditional duplex adapter. Thus, existing adapters can be removed and replaced with a dual-polarity adapter such as that shown in FIG. 3 with minimal cost, time and effort.

Figure 4A:
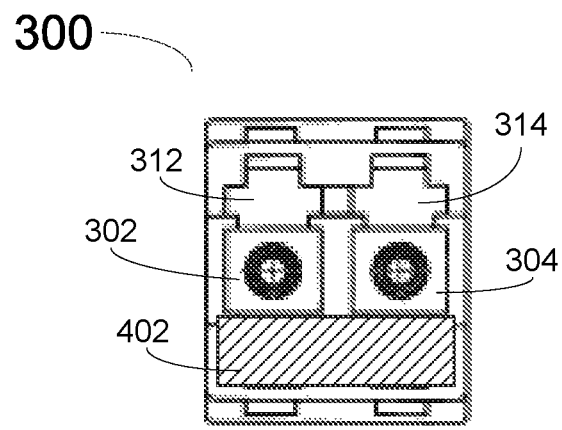
FIGS. 4A and 4B depict a multi-polarity duplex adapter including a spacer cap according to an embodiment.

In order to reduce potential confusion regarding the use of the multi-polarity adapter, the adapter may further include a spacer cap configured to cover the unused connector clip assemblies. For example, as shown in FIG. 4A, when a connector is inserted into the adapter 300 in a first position such that the spring-latch assembly of the connector is engaged with first-polarity connector clip assemblies 312, 314, a spacer cap 402 may be placed over the second-polarity connector clip assemblies 322, 324. Conversely, as shown in FIG. 4B, when a connector is inserted into the adapter 300 in a second position such that the spring-latch assembly of the connector is engaged with first-polarity connector clip assemblies 322, 324, the spacer cap 402 may be placed over the second-polarity connector clip assemblies 312, 314.

Figure 4B:
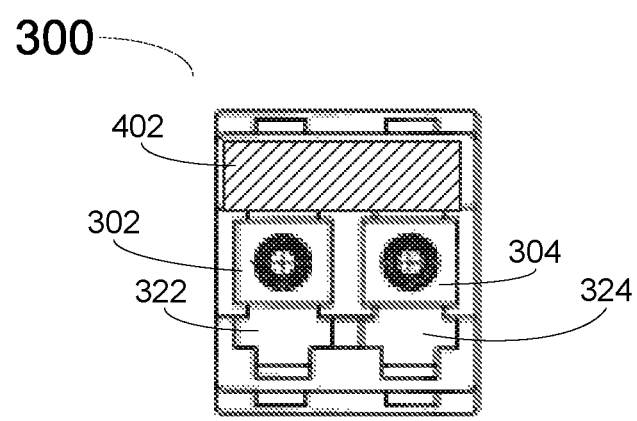

It should be noted that a single, removable spacer cap as shown in FIGS. 4A and 4B is shown by way of example only. In alternative embodiments, an adapter may include multiple spacer caps attached to the adapter (e.g., via a living hinge) and configured to be removed prior to insertion of a connector. Thus, when not in use at all, each set of connector clip assemblies may be covered with a spacer cap. In such an example, the spacer caps may be labeled to provide a technician other similar person using the adapter an indication of each polarity, thereby limiting the chance of improperly inserting a connector.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A multi-polarity fiber optic adapter configured to provide a plurality of connector polarity options, the adapter comprising:
    a housing;
    a plurality of ports positioned within the housing, each port configured to receive a ferrule of a fiber optic connector and establish an optical connection with the ferrule;
    a plurality of first-polarity connector clip assemblies positioned within the housing such that, when the fiber optic connector is inserted into the adapter in a first position, a spring-latch assembly on the fiber optic connector is engaged with the plurality of first-polarity connector clip assemblies, thereby establishing a first-polarity connection between the fiber optic connector and the adapter;
    a plurality of second-polarity connector clip assemblies positioned within the housing such that, when the fiber optic connector is inserted into the adapter in a second position, the spring-latch assembly on the fiber optic connector is engaged with the plurality of second-polarity connector clip assemblies, thereby establishing a second-polarity connection between the fiber optic connector and the adapter; and
    a spacer cap configured to be placed over the plurality of second-polarity connecter clip assemblies when the fiber optic connector is inserted into the adapter in the first position, and over the plurality of first-polarity connecter clip assemblies when the fiber optic connector is inserted into the adapter in the second position.

2. The adapter of claim 1, wherein the housing comprises a top surface positioned adjacent to the plurality of first-polarity connector clip assemblies and comprising one or more first receiving features configured to accommodate at least a portion of the spring-latch assembly when the fiber optic connecter is inserted into the adapter in the first position.

3. The adapter of claim 2, further comprising a bottom surface positioned opposite the top surface and adjacent to the plurality of second-polarity connector clip assemblies, the bottom surface comprising one or more second receiving features configured to accommodate at least a portion of the spring-latch assembly when the fiber optic connecter is inserted into the adapter in the second position.

4. The adapter of claim 1, wherein the plurality of ports comprises a first port and a second port.

5. The adapter of claim 4, wherein:
    when the fiber optic connector is inserted into the adapter in the first position, the first port is positioned to receive a first ferrule of the fiber optic connector and the second port is positioned to receive a second ferrule of the fiber optic connector; and
    when the fiber optic connector is inserted into the adapter in the second position, the first port is positioned to receive the second ferrule of the fiber optic connector and the second port is positioned to receive the first ferrule of the fiber optic connector.

6. A system for providing multiple polarity connections between a fiber optic connector and adapter, the system comprising:
    a fiber optic connector comprising:
        a first ferrule,
        a second ferrule, and
        a spring-latch assembly; and a multi-polarity fiber optic adapter configured to a receive the fiber optic connector, the adapter comprising:
  a housing,
    a plurality of ports positioned within the housing, each port configured to receive a ferrule of the fiber optic connector and establish an optical connection with the received ferrule,
    a plurality of first-polarity connector clip assemblies positioned within the housing such that, when the fiber optic connector is inserted into the adapter in a first position, the spring-latch assembly is engaged with the plurality of first-polarity connector clip assemblies, thereby establishing a first-polarity connection between the fiber optic connector and the adapter,
    a plurality of second-polarity connector clip assemblies positioned within the housing such that, when the fiber optic connector is inserted into the adapter in a second position, the spring-latch assembly is engaged with the plurality of second-polarity connector clip assemblies, thereby establishing a second-polarity connection between the fiber optic connector and the adapter, and
    a spacer cap is configured to be placed over the plurality of second-polarity connecter clip assemblies when the fiber optic connector is inserted into the adapter in the first position, and over the plurality of first-polarity connecter clip assemblies when the fiber optic connector is inserted into the adapter in the second position.

7. The system of claim 6, wherein the adapter further comprises a top surface positioned adjacent to the plurality of first-polarity connector clip assemblies and comprising one or more first receiving features configured to accommodate at least a portion of the spring-latch assembly when the fiber optic connecter is inserted into the adapter in the first position.

8. The system of claim 7, wherein the adapter further comprises a bottom surface positioned opposite the top surface and adjacent to the plurality of second-polarity connector clip assemblies, the bottom surface comprising one or more second receiving features configured to accommodate at least a portion of the spring-latch assembly when the fiber optic connecter is inserted into the adapter in the second position.

9. The system of claim 6, wherein:
  when the fiber optic connector is inserted into the adapter in the first position, the first port is positioned to receive the first ferrule of the fiber optic connector and the second port is positioned to receive the second ferrule of the fiber optic connector; and
  when the fiber optic connector is inserted into the adapter in the second position, the first port is positioned to receive the second ferrule of the fiber optic connector and the second port is positioned to receive the first ferrule of the fiber optic connector.

10. A method of changing the polarity of an optical connection, the method comprising:
  providing a fiber optic connector comprising:
    a first ferrule,
    a second ferrule, and
    a spring-latch assembly;
  providing a multi-polarity fiber optic adapter configured to a receive the fiber optic connector, the adapter comprising:
    a housing,
    a plurality of ports positioned within the housing, each port configured to receive a ferrule of the fiber optic connector and establish an optical connection with the received ferrule,
    a plurality of first-polarity connector clip assemblies positioned within the housing such that, when the fiber optic connector is inserted into the adapter in a first position, the spring-latch assembly is engaged with the plurality of first-polarity connector clip assemblies, thereby establishing a first-polarity connection between the fiber optic connector and the adapter, and
    a plurality of second-polarity connector clip assemblies positioned within the housing such that, when the fiber optic connector is inserted into the adapter in a second position, the spring-latch assembly is engaged with the plurality of second-polarity connector clip assemblies, thereby establishing a second-polarity connection between the fiber optic connector and the adapter;
  inserting the fiber optic connector into the adapter in the first position, thereby establishing the first-polarity connection between the fiber optic connector and the adapter;
  removing the fiber optic connector from the multi-polarity fiber optic adapter;
  rotating the fiber optic connector 180 degrees; and
  inserting the connector into the adapter in the second position, thereby establishing the second-polarity connection between the fiber optic connector and the adapter; and
  placing a spacer cap over the plurality of second-polarity connecter clip assemblies when the fiber optic connector is inserted into the adapter in the first position, and over the plurality of first-polarity connecter clip assemblies when the fiber optic connector is inserted into the adapter in the second position.

* * * * *